United States Patent [19]

Goldwasser et al.

[11] Patent Number: 5,321,099
[45] Date of Patent: Jun. 14, 1994

[54] BLENDS OF SEMI-CRYSTALLINE POLYAMIDES AND POLYESTERAMIDES

[75] Inventors: David J. Goldwasser, Lake Jackson, Tex.; Augustin T. Chen, Cheshire, Conn.

[73] Assignee: The Dow Chemical Company, Midland, Mich.

[21] Appl. No.: 816,191

[22] Filed: Jan. 2, 1992

[51] Int. Cl.$^5$ .................. C08L 77/10; C08L 77/12
[52] U.S. Cl. .................... 525/432; 525/425
[58] Field of Search ...................... 525/432, 425

[56] References Cited

U.S. PATENT DOCUMENTS

| | | | |
|---|---|---|---|
| 4,258,154 | 3/1981 | Kyo | 525/425 |
| 4,473,688 | 9/1984 | Zappa | 525/432 |
| 4,536,533 | 8/1985 | Chen | 524/161 |
| 4,547,547 | 10/1985 | Chen | 524/538 |
| 4,562,228 | 12/1985 | Chen | 525/66 |
| 4,579,914 | 4/1986 | Nelb et al. | |
| 4,612,353 | 9/1986 | Andrews et al. | |
| 4,874,800 | 10/1989 | Minamisawa et al. | 523/205 |
| 4,977,213 | 12/1990 | Giroud-Abel et al. | 525/66 |

FOREIGN PATENT DOCUMENTS 0738308  3/1970  Belgium .

Primary Examiner—James J. Seidleck
Assistant Examiner—I. Zemel

[57] ABSTRACT

Blends of (1) a crystalline polyamide derived from 4,4'-diphenylmethane diisocyanate (MDI) and a dicarboxylic acid and (2) a segmented polyesteramide derived from (a) MDI, (b) a carboxylic acid-terminated polyester prepolymer, a carboxylic acid-terminated polyether prepolymer or a carboxylic acid-terminated polycarbonate prepolymer and (c) from 0 to 10 moles of a dicarboxylic acid per mole of prepolymer, exhibit increased tensile ductility and are useful in the manufacture of headlamp reflectors, electrical connectors, molded circuit boards and the like.

22 Claims, No Drawings

BLENDS OF SEMI-CRYSTALLINE POLYAMIDES AND POLYESTERAMIDES

BACKGROUND OF THE INVENTION

This invention relates to semi-crystalline polyamides and, more particularly, to modified semi-crystalline polyamides.

Semi-crystalline or crystalline polyamides (CPA) are known in the art and are described, for example, in U.S. Pat. Nos. 4,501,844 and 4,806,589. In the '589 patent, CPA is added to polyethylene terephthalate (PET) to increase the crystallization rate of PET. The terms "crystalline" and "semi-crystalline" are used herein interchangeably, although "semi-crystalline" is a more appropriate term to describe crystallinity in polymers than "crystalline" because most "crystalline" polymers have an appreciable amount of amorphous, uncrystallizable material even after their level of crystallinity has been maximized. Semi-crystalline polyamides are known to be useful in applications that require good load bearing, good solvent resistance and good heat resistance, such as automotive under the hood applications or electronic parts.

To achieve maximum heat resistance, semi-crystalline polyamides (CPA) need high degree of crystallization. Insufficiently crystallized CPA parts can distort severely when heated above their $T_g$ (about 125° C.), whereas CPA parts with sufficient degree of crystallization do not distort significantly until temperatures approach the melting point ($T_m$) which is about 285° C. However, highly crystallized crystalline polyamides are brittle and, therefore, have limited utility. To minimize the effects of brittleness in highly crystallized CPAs, fillers and fibrous reinforcements are usually used. Using fillers and reinforcements, however, do not provide a satisfactory solution to the problem because they cannot be used in applications which require unfilled compositions. One such application is for lamp reflectors which require a smoother surface than can be achieved with filled compositions.

Typically, the mold temperature range required to achieve sufficient crystallization with CPA during injection-molding cycle of less than about 1 minute is between about 150° C. and about 175° C. If the mold temperature is below about 150° C., parts with an amorphous skin and a crystalline core are formed. The amorphous skin can be detected visually because amorphous CPA is transparent and crystallized CPA is relatively opaque. CPA with sufficient degree of crystallization will be referred to hereinafter as "fully crystallized CPA" and that with insufficient degree of crystallization will be referred to hereinafter as "partially crystallized CPA."

It would be desirable to provide fully crystallized crystalline polyamides which do not contain reinforcements or fillers, yet have good toughness and good thermal properties.

SUMMARY OF THE INVENTION

The present invention is, in one aspect, a blend comprising (1) a crystalline polyamide (CPA) derived from 4,4'-diphenylmethane diisocyanate (MDI) and a dicarboxylic acid and (2) a segmented polyesteramide having a "soft" polyol segment and a "hard" polyamide segment characterized by a recurring unit of the formula

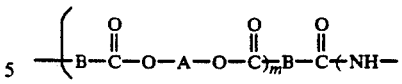

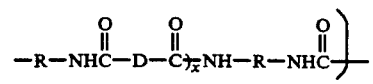

wherein R is selected from the class consisting of arylene of the formula:

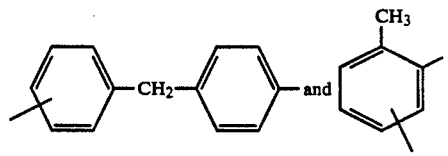

and mixtures thereof, A is the residue of a polymeric diol HOAOH (II) having a molecular weight of from about 400 to about 4000, B is the residue of a dicarboxylic acid HOOC-B-COOH (III) selected from the class consisting of aliphatic dicarboxylic acids having from 6 to 14 carbon atoms, inclusive, and isophthalic and terephthalic acids, m has a mean value of not more than 1 but greater than 0, D is the residue of an aliphatic dicarboxylic acid HOOC-D-COOH (IV) such that the melt temperature of the hard segment, of which it forms a part, is not greater than 300° C., and x is a number having an average value from zero to 10, said segmented polyesteramide being present in an amount sufficient to increase the ductility of CPA (measured as strain at failure in a tensile test) without decreasing its heat resistance (measured as its HDT at 66 psi) by more than 30%.

In another aspect, this invention is a three-dimensional article fabricated of the blend of crystalline polyamide and polyesteramide. In yet a further aspect, this invention is a film, fiber or coating made of the blend.

Surprisingly, the blends of the present invention exhibit improved physical properties such as strain at failure in a tensile test, which is a measure of practical ductility, while still possessing good thermal properties measured by HDTs at 264 and 66 psi. Tensile and flexure strengths or moduli of the blends suffer only minor losses or, in some cases, are increased slightly by the addition of the segmented polyesteramide. Furthermore, adding the segmented polyesteramide to the CPA enhances the extrusion characteristics of CPA by reducing the tendency of extruded strands to neck and tear while still molten. The segmented polyesteramide also improves injection molding of the CPA by reducing injection mold barrel temperature and shortening cycle times. It also appears that the segmented polyesteramide increases the combustion resistance of CPA by raising its oxygen index. This is surprising because the segmented polyesteramide burns more readily than CPA.

The blends of the present invention are suitably used in the manufacture of headlamp reflectors, electrical connectors, molded circuit boards and the like.

DETAILED DESCRIPTION OF THE INVENTION

Preferably, the crystalline polyamide component of the blends of the present invention is derived from 4,4'-diphenylmethane diisocyanate (MDI) and a dicarboxylic acid selected from the group consisting of azelaic acid, sebacic acid, undecanedioic acid, dodecanedioic acid and glutaric acid.

The crystalline polyamides are specifically prepared from 4,4'-methylenebis(phenyl isocyanate) and the appropriate dicarboxylic acid in essentially stoichiometric proportions. While it is preferred to use essentially pure 4,4'-isomer, minor amounts (up to about 20 percent) of 2,4'-methylenebis(phenyl isocyanate) may be present with the 4,4'-isomer. The carbodiimide form of MDI is also suitable. Typical methods for preparing the crystalline polyamides using the diisocyanate and dicarboxylic acids are described in U.S. Pat. Nos. 3,462,715, 4,061,622, 4,094,866, 4,420,602, 4,420,603 and 4,672,094, whose disclosures relative thereto are incorporated herein by reference.

Preferred species of polyamides in accordance with the present invention are poly(4,4'-methylenediphenylene azelamide) and poly(4,4'-methylenediphenylene dodecanediamide).

Minor amounts (from about 2 to about 10 mole percent) of other recurring polymer linkages such as other polyamide, polyether and polyester, can be present in the polyamides. However, the preferred polyamides do not contain such other copolymer linkages. Physical mixtures of the above described polyamides can be used in accordance with the present invention.

Advantageously, the crystalline polyamides have an inherent viscosity in the range of from about 0.5 to about 1.5 and, preferably, from about 0.7 to about 1.1, as determined under standard test conditions: e.g., at 0.5 percent by weight in N-methylpyrrolidone containing about 4 percent by weight of lithium chloride and at about 30° C.

Preferably, the segmented polyesteramide component of the blends of the present invention is derived from a carboxylic acid-terminated polyester prepolymer, a carboxylic acid-terminated polyether prepolymer or a carboxylic acid-terminated polycarbonate prepolymer.

The term "polymeric diol" which is used herein to characterize residue A in formula (I) above is inclusive of polyether and polyester diols having molecular weights within the stated range. Illustrative of the polyether diols are the poly(alkylene ether) diols obtained by polymerizing one or more cyclic ethers such as ethylene oxide, propylene oxide, butylene oxide and tetrahydrofuran.

Illustrative of the polyester diols are those obtained by reacting dicarboxylic acid, such as adipic, suberic, azelaic, glutaric acids and the like, with an excess, over the stoichiometric amount, of a dihydric alcohol such as ethylene glycol, propylene glycol, 1,4-butanediol, 1,6-hexanediol and the like, including mixtures of two or more such diols. Esters of lactones, such as caprolactone, are also suitable.

The term "aliphatic dicarboxylic acids having from 6 to 14 carbon atoms" means the acids represented by the formula HOOC-B-COOH wherein the total number of carbon atoms, including those in the carboxylic groups, lies within the stated range and B represents straight or branched chain alkylene having the appropriate carbon atom content. Illustrative of such acids are adipic, pimelic, suberic, azelaic, sebacic, 1,11-undecandioic, and 1,12-dodecanedioic, brassylie, α-methyladipic, α,α-dimethyladipic, α-ethylpimelic, α-ethyl-α-methylpimelic, β,β-diethyl-β,β-dimethylsuberic, 2,2,4-trimethyladipic, 2,4,4-trimethyladipic, α,α-dimethylazelaic and α,α,α',α'-tetramethylsebacic acids.

The term "dicarboxylic acid HOOC-D-COOH" is inclusive of straight and branched chain aliphatic dicarboxylic acids which do not raise the melt temperature of the hard section of the polymer into which they are introduced above about 300° C. Illustrative of such acids are adipic, azelaic, sebacic, suberic, 1,11-undecanedioic, brassylie, and trimethyladipic acids. Particularly preferred are azelaic and adipic as well as a mixture of approximately equimolar amounts of these two acids.

The above segmented polyesteramides are described in more detail in U.S. Pat. No. 4,129,715 which is incorporated herein by reference. A detailed procedure for the preparation of these polyesteramides is also described in this patent. Briefly, the polyesteramides are prepared by a two step procedure. The first step comprises preparing a carboxylic acid-terminated prepolymer by reacting at least 2 molar proportions of a dicarboxylic acid HOOC-B-COOH (III), wherein B is as defined earlier, or a mixture of two or more such acids (III), with 1 molar proportion of a polymeric diol HO-A-OH (II) having a molecular weight within the range stated above. The second step comprises reacting the carboxylic acid-terminated prepolymer from the first step with the appropriate diisocyanate R(NCO)$_2$, wherein R is as hereinbefore defined, to form the polyesteramide characterized by the recurring unit (I) in which the value of x is 0. In the case where the value of x is greater than 0, but not more than 10, there is included in the reaction mixture, in addition to the carboxylic acid-terminated prepolymer and diisocyanate, a dicarboxylic acid HOOC-D-COOH (IV) or a mixture of two or more such acids. Advantageously, the dicarboxylic acid (IV) is a straight chain aliphatic dicarboxylic acid having from about 6 to about 14 carbon atoms (inclusive of those in the carboxylic groups) but other dicarboxylic acids can be employed provided that the acids are such that the melt temperature of the hard section of the polymer into which the said acid is introduced is raised thereby above about 280° C.–300° C. The proportion in which the dicarboxylic acid or mixture of acids (IV) is introduced into the segmented polyesteramides is advantageously not greater than about 10 moles per mole of prepolymer and, preferably, is in the range of from about 0 mole to about 3 moles per mole of prepolymer.

The polyesteramides described in the '715 patent which are prepared by replacing the carboxy-terminated prepolymers with a carboxy-terminated copolymer of butadiene and acrylonitrile or like vinyl monomer are also suitable.

Other polyesteramide thermoplastic elastomers suitable for the present invention are those described in U.S. Pat. Nos. 4,649,180. These polyesteramides are prepared identically to those disclosed in U.S. Pat. No. 4,129,715 using the same ingredients and procedures except for the polymeric diols which form the soft segment components of the resulting polymers. The polymeric diol used in U.S. Pat. No. 4,649,180 is a polycarbonate diol instead of a polyether or polyester diol.

The polyesteramide component is employed in an amount sufficient to increase the ductility of CPA (measured as strain at failure in a tensile test) without decreasing its heat resistance (measured as its HDT at 66 psi) by more than 30%.

Preferably, the proportions in which the polyesteramide component and crystalline polyamide component are employed in the blends is within the range of from about 40 to about 99 percent by weight of crystalline polyamide and from about 1 to about 60 percent by weight polyesteramide. More preferably, the crystalline polyamide is employed in an amount of from about 50 to about 95 percent by weight and, most preferably, in an amount of from about 60 to about 90 percent by weight, and the remainder of the blend is polyesteramide and other polymeric components or modifiers.

The blends can be prepared in any convenient manner, for example, by bringing together the two components in solid form and dry-blending, using conventional means such as, for example, a barrel mixer or a tumble mixer, followed by fluxing or melt-blending in an appropriate apparatus, such as a Banbury type internal mixer, rubber mill, single or twin screw extruder or compounder, and the like. Preferably, the two components are brought together and processed in an appropriate melt extruder from which the blend is extruded in the form of strands and the like. The strands are then pelletized for injection molding and other thermal processes. Standard techniques and apparatuses well known in the art can be used for these processes. The most preferred conditions for preparing the crystalline polyamide blends of this invention are set forth in the following working examples.

The blends of this invention can also incorporate various additives such as fillers, antioxidants, dyes, pigments, flame retardants, plasticizers, reinforcing agents, nucleating agents, and the like, which are commonly employed in the art in polyesteramide compositions. The additives are readily incorporated into the blends during the formation of the latter using any of the procedures described above.

Dyes and pigments are used, for example, in amounts of from 0.001 to 5 weight percent based on the weight of the blend. Examples are nigrosine, titanium dioxide, cadmium sulfide, phthalocyanine dyes, ultramarine blue and carbon black.

Examples of fillers and reinforcing agents are carbon fibers, glass fibers, polyaramid fibers, amorphous silica, calcium silicate, aluminum silicate, magnesium carbonate, kaolin, chalk, powdered quartz, talc, mica and feldspar, which may be present in a concentration of from 0.5 to 70 weight percent, based on the total weight of the filled material.

Examples of anti-oxidants are the sterically hindered polyphenols, such as Irganox 1010 and Irganox 1098 which are commercially available from Ciba Geigy.

Examples of flame retardant additives include phosphorous-containing compounds, halogen-containing compounds and combinations of halogen-containing compounds and antimony compounds.

Examples of nucleating agents are talc, sodium benzenesulfonate, polyethylene ionomers and methacrylated butadiene-styrene polymers. Other suitable nucleating agents are described in U.S. Pat. No. 4,536,533, the relevant portions of which are incorporated herein by reference. Suitably, the nucleating agent may be present in an amount of from 0.001 to 5 weight percent, based on the weight of the blend.

Plasticizers, such as phthalates, hydrocarbon oils and sulfonamides can be added in an amount of from 0.0001 to 20 weight percent, based on the weight of the blend.

The blends of the present invention can be fabricated into films, fibers and three-dimensional articles by using conventional fabrication techniques such as extrusion, compression molding and injection molding.

The following working examples are given to illustrate the invention and should not be construed as limiting its scope. Unless stated otherwise, all parts and percentages are given by weight.

EXAMPLE 1

A. Preparation of Crystalline Polyamide A

The CPA used in this example is prepared following the general procedures outlined in U.S. Pat. No. 4,806,589, which is incorporated herein by reference.

In preparing the CPA, a solution of 542.2 lbs. of azelaic acid and 13.1 lbs. of stearic acid in approximately 2353 lbs. of dry distilled tetramethylenesulfone solvent is charged into an oil-jacketed 500 gallon kettle. The solution is heated under a vacuum at 140° C.–160° C. until the water level is below 80 ppm. Vacuum is removed and 1444 gms of methylpholene oxide catalyst is added. The solution is heated to about 210° C. under a nitrogen sweep. Approximately 90% of the stoichiometric amount of a 50% solution of MDI in tetramethylenesulfone is then added over an interval of about 4 hours. Two increments of approximately 2 eq. % of MDI are then added followed by pauses of 1 hour. Inherent viscosities are measured at concentrations of 0.5 g/dl of polymer in NMP (N-methylpyrrolidinone) containing 4% LiCl measured at 30° C. after the end of the intervals. MDI is then added in increments of about 0.5 eq. % or less followed by one hour pauses after which inherent viscosities are measured. This procedure is continued until the inherent viscosity of the mixture in the reactor reaches the desired level of 0.85 to 1.05 dl/gm. The solution is held at 210° C. to 215° C. for several hours to allow the reaction to be completed.

The solution is placed into 3-gallon chimeless steel pails and allowed to solidify over several days. The solid solution of crystalline polyamide (polymer) which has the consistency of a moderately hard wax is then ground into a coarse powder. The tetramethylenesulfone is removed by repeatedly washing the solid polymer with water until the material contained about 0.5% tetramethylenesulfone or less. The polymer powder is then centrifuged and dried in a tray drier.

The recovered polymer is a free-flowing powder composed of off-white colored agglomerated particles which would break up under shear. Pellets are prepared from the powder by extruding the powder in a twin screw extruder with 1% of an antioxidant (Irganox 1010) and 1% talc.

B. Preparation of Soft Segment Prepolymer of Polyesteramide A 1,4-butanediol (1432 lb.) is charged into a steam heated, agitated 2000 gallon kettle preheated to about 180° F. Azelaic acid flake (3797 lbs.) is then loaded into the kettle. After the acid flakes are loaded, the kettle jacket temperature is increased to the maximum possible temperature by using 353° F., 140 psig steam. The reaction is carried out under a nitrogen purge at approximately 353° F. Water produced by the reaction is collected. After 500 lbs. of water is collected (equivalent weight of approximately 374), the acid equivalent weights are measured every hour until the target value of 510–550 daltons/equivalent is reached. After reaching the desired molecular weight, the moisture content of the reaction medium is reduced to 75 ppm by using a subsurface nitrogen sparge and continued heating. The soft segment prepolymer obtained is a difunctional, acid-terminated poy(butanediol azelate) whose equivalent weight ranges between 510 and 550 daltons/equivalent.

C. Preparation of Polyesteramide A

Distilled, molten tetramethylenesulfone solvent (3234 lbs.) is charged into an agitated 500 gal oil jacketed kettle. The solvent is dried by heating it to 140° C. under a vacuum of 75 to 150 torr. A subsurface nitrogen sparge is employed to help dry the solvent. These conditions are maintained until the water content of the solvent reaches 70 to 100 ppm. Approximately 861 g of dimethylphospholene oxide (DMPO) is then added, followed by 122 lbs. of azelaic acid and 530 lbs. of the acid-terminated prepolymer prepared in Part A. The vacuum and sparge are maintained until the water content of the resulting solution reaches 70 to 100 ppm. Vacuum is then removed and the solution is heated to 205° to 210° C. under a nitrogen blanket.

Molten 4,4'-methylenebis(phenylisocyanate) (MDI) is added to the above solution according to the following schedule:

| Equiv. % of MDI added | Rate | Total Lbs. Added |
|---|---|---|
| 0–70% | 1.27 lbs/min | 199.8 |
| 70–95% | 0.75 lbs/min | 271.2 |
| 95–98% | 0.135 lbs/min | 279.7 |

The polymer solution inherent viscosity is measured at 0.5 g/dl in n-methylpyrrolidinone (NMP) at 30° C. following a ½ hour wait after reaching 98% of theoretical amount of MDI. If the inherent viscosity is below about 0.77 dl/g, an additional 1% of MDI is added. The solution is held for ½ hour and the inherent viscosity is remeasured. If the inherent viscosity is still below the target value of 1.05 +/− 0.05 dl/g, additional MDI is added in increments of 0.1–0.25 equivalent percent. Inherent viscosities are measured after ½ hour waits. This procedure is continued until the inherent viscosity reaches the target value. The solution is then held for 1 hour at 205° C.-210° C. and the inherent viscosity is remeasured to insure that it has stabilized. 4.1 lbs. of Irganox 1098 antioxidant (Ciba-Geigy) is then added to the polymer solution. The final solids content of the reaction solution is about 21 to 22% by weight.

Tetramethylenesulfone solvent is recovered from the polymer solution by using two wiped-film evaporators (Luwa Filmtruder) operating in series. Pellets are prepared continuously by pumping the resulting polymer melt through an underwater pelletizer. After drying the pellets in a dehumidifying hopper drier, the obtained segmented polyesteramide contains about 0.2% or less residual solvent.

D. Preparation of the Blend of Polyesteramide A and Crystalline Polyamide A

After drying, the crystalline polyamide pellets prepared above are blended with Polyesteramide A in the proportions shown in Table I within a co-rotating twin screw extruder at conditions given in Table II. The extrudate is allowed to cool on a belt and chopped into small pieces. The resin is dried overnight prior to molding in a dehumidifying hopper dryer at 305° F.

E. Physical Properties

The pellets are injection-molded into test pieces using conditions similar to those given in Table III and tested for tensile properties (strength, modulus), elongation at failure, flexural properties (strength, modulus), notched izod impact, oxygen index and Heat Deflection Temperature (HDT) and the results are shown in Table I. The following ASTM Test Methods are used:

| Properties | ASTM |
|---|---|
| Notched Izod Impact Strength | D 256 |
| Tensile properties | D 638 |
| Flexural properties | D 790 |
| Oxygen Index | D 2863 |
| Heat Deflection Temperature | D 648 |

TABLE I

Properties of Blends of CPA With Polyesteramide A

| | Composition | | |
|---|---|---|---|
| CPA, % | 100 | 85 | 70 |
| Polyesteramide A*, % | 0 | 15 | 30 |
| Density, GM/CC | 1.20 | 1.186 | 1.165 |
| Tensile Strength, KSI | 5.3 | 10.4 | 7.78 |
| Tensile Modulus, KSI | 356 | 368 | 283 |
| Elongation at Failure, % | 1.6 | 9.7 | 15.6 |
| Flexure Strength, KSI | 10 | 17.1 | 9.95 |
| Flexure Modulus, KSI | 413 | 478 | 232 |
| Notched Izod 0.125", Ft-Lb/in | 1.3 | 0.85 | 1.10 |
| Notched Izod 0.250" Ft-Lb/in | — | 1.20 | 1.18 |
| HDT @ 264 PSI, C | 120 | 119 | 105 |
| HDT @ 66 PSI, C | 233 | 177 | 172 |
| Oxygen Index, % | 29.4 | 32.2 | 32.4 |

*An ester-amide elastomer commercially available from The Dow Chemical Company

The data in Table I shows that the strain (elongation) at failure of the neat CPA is increased from 1.6% to 9.7% at 15% Polyesteramide A level and to 15.6% at 30% Polyesteramide A level. Surprisingly, tensile and flexure strength and stiffness are enhanced somewhat at 15% polyesteramide A but are decreased when the Polyesteramide A level reaches 30%. The increase in strength at 15% is surprising since polyesteramide addition usually decreases tensile and flexure strength and stiffness. The data also show that addition of Polyesteramide A to CPA increases the flammability resistance of the blend as measured by oxygen index.

The Table I data further show that HDT values for the blends at 264 psi do not differ significantly from those for the neat CPA.

COMPARATIVE EXAMPLE A

A blend of Crystalline Polyamide A with 30% of a commercially available amide-ether elastomer manufactured by Atochem, Inc, under the trademark PEBAX ™ is prepared following the procedures of Example 1. Compounding conditions are given in Table II. An attempt was made to mold parts from the blend using conditions employed in Example 1, but the parts are so soft, they can not be removed from the press. In contrast, under identical conditions, the CPA/Polyesteramide A blends of Example 1 are easily ejected from the mold.

TABLE II

| | Nonfire Retarded Blends | CPA-Fire Retarded Blends (No polyester amide) | CPA-Fire Retarded Blends (15% and 30% Polyester amide A[1]) | CPA-Fire Retarded Blends 30% PEBAX[2] |
|---|---|---|---|---|
| Compounding Conditions for Fully crystallized Parts | | | | |
| Screw Speed, RPM | 215 | 184 | 173 | 208 |
| Power, A | 12 | 16 | 9 | 10 |
| Temp., °F. | 540–545 | 525–535 | 525–535 | 525–535 |
| Melt Press., PSI | 80 | 70 | 110 | 70 |
| Die Temp., F. | 450 | 445 | 450 | 450 |
| Feed Rate, GM/Min | 107 | 107 | 107 | 107 |
| Melt Temp., °C. | 288 | 288 | 288 | 288 |

[1] An ester-amide elastomer commercially available from The Dow Chemical Company
[2] PEBAX 4033 is an amide-ether elastomer manufactured by Atochem, Inc.

TABLE III

Molding Conditions for Fully Crystallized Parts[1]

| | Neat CPA | 85% CPA 15% Polyester amide A | 70% CPA 30% Polyester amide A |
|---|---|---|---|
| Barrel Temp., °C. | 295 | 260 | 250 |
| Injection Press., PSI | 1100 | 500 | 500 |
| Injection Speed[2] | 4 | 4 | 4 |
| Cooling Time, Sec. | 35 | 30 | 15 |
| Mold Temp., °C. | 165 | 165 | 165 |

[1] 5" × 5" × 1/16" plaque on an Arburg 305E injection molding press with a parting line mold. Conditions used to mold test pieces on an Arburg 221E injection molding press are about the same.
[2] 5 is fastest and 1 is slowest.

The data in Table III indicates that addition of Polyesteramide A to CPA reduces processing temperature and shortens cycle time, as indicated by the decrease in cooling time.

EXAMPLE 2

In this example, the mechanical properties of partially crystallized and fully crystallized CPA are compared.

Blends containing 15 and 30% polyesteramide A are prepared as in Part C of Example I and tested for physical properties. HDTs are measured on ¼" thick samples. The amorphous region on a ¼" thick sample prepared at a mold temperature of 90° C. consists of a sheet of amorphous material about 1/32" thick which forms the outer skin of the sample. The thickness of the amorphous skin deepens primarily on mold temperature and not on part thickness. However, the percentage of material which is amorphous will decrease with increasing part thickness. The test results are presented in Table IV.

TABLE IV

A Comparison of Properties of Fully and Partially Crystallized Unfilled CPA

| Property | CPA Partially cryst. | CPA Fully Cryst. |
|---|---|---|
| Mold Temp. °C. | 90 | 15 |
| Tensile Str., Ksi | 10.3 | 5.3 |
| Elongation at Failure, % | 5.0 | 1.6 |
| Flexure Str., Ksi | 17.5 | 10 |
| Flexure Mod., Ksi | 357 | 413 |
| ¼" Notched Izod, Ft-lb/in | 1.7 | 1.3 |
| HnT @ 264 Psi, °C. | 130 | 130 |
| HDT @ 66 Psi, °C. | 224 | 232 |
| Oxygen Index, % | — | 29.0 |

TABLE IV-continued

A Comparison of Properties of Fully and Partially Crystallized Unfilled CPA

| Property | CPA Partially cryst. | CPA Fully Cryst. |
|---|---|---|
| UL 94 Rating | — | Unclass- |

The data in Table IV shows that the fully crystallized CPA has better dimension stability as indicated by HDT at 66° C. and better load bearing properties as indicated by flexural modulus, than partially crystallized CPA. However, the data also show that tensile ductility (measured by strain at failure) of CPA is lower in fully crystallized form than in partially crystallized form. The HDTs at 264 psi of both the partially and fully crystallized samples are substantially lower than values at 66 psi indicating that substantial crystallization takes place during molding.

EXAMPLE 3

Blends of Polyesteramide A and Crystalline Polyamide A in the proportions shown in Table V are prepared as in Part C of Example I and tested for physical properties. The test results are presented in Table V. These blends are prepared with a minor amount of a flame retarding additive which would not be expected to affect mechanical properties.

TABLE V

Properties of Flame Retarded Blends of CPA and Polyesteramide A

| COMPOSITION | | | | |
|---|---|---|---|---|
| CPA, % | 95 | 98 | 81.6 | 67.6 |
| Polyesteramide A, % | — | — | 14.4 | 29.0 |
| Flame Retardant*, % | 5.0 | 2.0 | 4.0 | 3.5 |
| PROPERTIES | | | | |
| Tensile Str., Ksi | 9.6 | 10.9 | 10.8 | 8.11 |
| Tensile Mod., Ksi | 456 | 490 | 366 | 304 |
| Elongation at Failure, % | 2.9 | 3.6 | 7.4 | 29.5 |
| flexure Str. Ksi | — | 16.3 | 12.0 | 12.0 |
| Flexure Mod., Ksi | — | 388 | 310 | 267 |
| ⅛" Notched Izod Ft-Lb/In | 0.65 | 0.61 | 0.82 | 0.89 |
| ¼" Notched Izod Ft-Lb/In | 1.30 | — | — | 1.30 |
| HDT @ 264 PSI, °C. | 128 | 126 | 121 | — |
| HDT @ 66 PSI, °C. | 223 | 233 | 214 | 225 |
| Oxygen Index, % | 38.9 | 36.1 | 40.0 | 36.1 |
| Ul 94 Rating | V-0 | V-0 | V-0 | V-0 |

*A blend of a 2.9 to 1 ratio of PO-64P brominated polymeric flame retardant commercially available from Great Lakes Incorporated, U.S.A. with antimony oxide in a polyamide binder which constitutes 10% of the blend. PO-64P is a poly(dibromophenylene oxide) which contains 64% by weight of bromine.

The data in Table V shows that addition of Polyesteramide A to Crystalline Polyamide A increases ductility without adversely affecting HDTs or causing excessive losses in strength or stiffness. The data also show that addition of Polyesteramide A at 14.4 wt. % increases the tensile strain at failure to 7.4% and at 29 wt. % increases the value to 29.5%. Tensile moduli and flexure moduli decrease as the level of Polyesteramide A is increased. Flexure strengths also decrease, but tensile strength is less affected as the level of Polyesteramide A increases.

EXAMPLE 4

Two additional blends of Crystalline Polyamide A and Polyesteramide A in the proportions shown in Table VI are prepared on a ¾" single screw extruder from dried pellets and other ingredients shown below. The strand extruded through the extruder die is allowed to cool on a belt and is chopped into pellets. The same molding procedure in Examples 1 and 2 is employed in this example, except the mold temperature is about 125° C., whereby the blends are molded in partially crystallized form. The blends are tested for physical properties and the results are shown in Table VI.

| Ingredients | Blends | |
|---|---|---|
| | A[1] | B[2] |
| CPA | 420 g | 600 g |
| Polyesteramide A | 180 g | 600 g |
| Talc (Pfizer MP 10-52) | 12 g | — |
| Antioxidant (Irganox 1098) | 12 g | 18 g |
| TiO$_2$ (Glidden r 69) | 6 g | — |

[1]CPA is prepared as in U.S. Pat. No. 4,536,533. Its inherent viscosity is 1.1 dl/g.
[2]CPA is prepared as in Part C of Example 1, but the solvent is removed from the polymer as in Part B of Example 1. Residual solvent is reduced by devolatilization in a counter-rotating twin screw extruder with a vacuum of between 1 and 2% by weight. The inherent viscosity of the CPA lot is about 0.85 dl/g.

TABLE VI

Properties of Blends of CPA with Polyesteramide A Molded In Partially Crystallized Form

| Composition | | |
|---|---|---|
| CPA, % | 70 | 50 |
| Polyesteramide A | 30 | 50 |
| Properties | | |
| Tensile Strength, Ksi | 7.4 | 5.0 |
| Tensile Modulus, Ksi[1] | 265 | 186 |
| Elongation at Failure, % | 62 | 72 |
| Flexure Strength, KSI | 9.42 | 4.05 |
| Flexure Modulus, KSI | 361 | 187 |
| Notched Izod 0.125", FT-LB/IN | 3.5 | 4.8 |
| HDT @ 264 PSI, °C. | 97 | 87 |
| HDT @ 66 PSI, °C. | 130 | 120 |

[1]Extensometer not used

The data in Table VI show HDT values which are lower, especially at 66 psi, for the sample containing 30% Polyesteramide A, and tensile ductility at failure and Izod impact strength which are higher than values presented in Tables IV and V for an equivalent sample molded in crystalline form.

What is claimed is:

1. A blend comprising (1) a crystalline polyamide derived from 4,4'-diphenylmethane diisocyanate (MDI) and a dicarboxylic acid and (2) a segmented polyesteramide having a soft polyol segment and a hard polyamide segment characterized by a recurring unit of the formula:

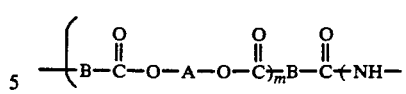

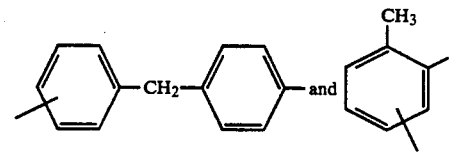

wherein R is selected from the class consisting of arylene of the formula:

and mixtures thereof, A is the residue of a polymeric diol HOAOH (II) having a molecular weight of from about 400 to about 4000, B is the residue of a dicarboxylic acid HOOC-B-COOH (III) selected from the class consisting of aliphatic dicarboxylic acids having from 6 to 14 carbon atoms, inclusive, and isophthalic and terephthalic acids, m has a mean value of not more than 1 but greater than 0, D is the residue of an aliphatic dicarboxylic acid HOOC-D-COOH (IV) such that the melt temperature of the hard polyamide segment, of which it forms a part, is not greater than 300° C., and x is a number having an average value from zero to 10, said segmented polyesteramide being present in an amount sufficient to increase the ductility of the crystalline polyamide (measured as strain at failure in a tensile test) without decreasing its heat resistance (measured as its HDT at 66 psi) by more than 30%.

2. The blend of claim 1 wherein the segmented polyesteramide is derived from (a) MDI, (b) a carboxylic acid-terminated polyester prepolymer, a carboxylic acid-terminated polyether prepolymer or a carboxylic acid-terminated polycarbonate prepolymer and (c) from 0 to 10 moles of a dicarboxylic acid per mole of prepolymer.

3. The blend of claim 1 wherein the crystalline polyamide component is present in an amount of from about 40 to about 99 percent by weight of the blend, and the segmented polyesteramide component is present in an amount of from about 1 to about 60 percent by weight of the blend.

4. The blend of claim 3 wherein the crystalline polyamide component is present in an amount of from about 50 to about 95 percent by weight of the blend, and the segmented polyesteramide component is present in an amount of from about 5 to about 50 percent by weight of the blend.

5. The blend of claim 3 wherein the crystalline polyamide component is present in an amount of from about 60 to about 90 percent by weight of the blend, and the segmented polyesteramide component is present in an amount of from about 10 to about 40 percent by weight of the blend.

6. The blend of claim 1 wherein the crystalline polyamide component is derived from 4,4'-diphenylmethane diisocyanate (MDI) and a dicarboxylic acid selected from the group consisting of azelaic acid, sebacic acid, undecanedioic acid, dodecanedioic acid and glutaric acid.

7. The blend of claim 6 wherein the crystalline polyamide component is poly(4,4'-methylenediphenylene) azelamide.

8. The blend of claim 6 wherein the crystalline polyamide component is poly(4,4'-methylenediphenylene) dodecanediamide.

9. The blend of claim 1 wherein A is the residue of a polyether glycol.

10. The blend of claim 1 wherein A is the residue of a polyester glycol.

11. The blend of claim 9 wherein the polyether glycol is a polytetramethylene glycol.

12. The blend of claim 9 wherein the polyether glycol is a polypropylene glycol capped with ethylene oxide.

13. The blend of claim 1 wherein D is the residue of azelaic acid.

14. The blend of claim 1 wherein B is the residue of adipic acid.

15. The blend of claim 1 wherein B is the residue of a mixture of approximately equimolar amounts of azelaic acid and adipic acid.

16. The blend of claim 1 wherein B is the residue of azelaic acid.

17. The blend of claim 1 wherein B is the residue of adipic acid.

18. The blend of claim 1 wherein B is the residue of a mixture of approximately equimolar amounts of azelaic acid and adipic acid.

19. The blend of claim 1 in the form of a film.

20. The blend of claim 1 in the form of a three dimensional molded article.

21. The blend of claim 1 in the form of a barrier container.

22. The blend of claim 1 in the form of a coating.

* * * * *

UNITED STATES PATENT AND TRADEMARK OFFICE
CERTIFICATE OF CORRECTION

PATENT NO. : 5,321,099
DATED : June 14, 1994
INVENTOR(S) : David J. Goldwasser and Augustin T. Chen It is certified that error appears in the above-indentified patent and that said Letters Patent is hereby corrected as shown below:

Col. 12, line 4,

"
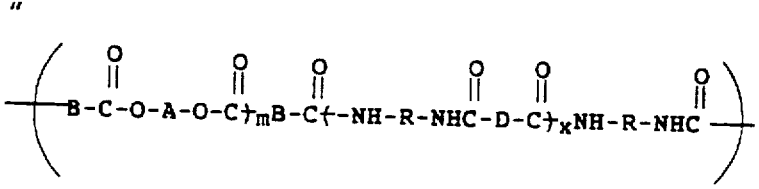
"

should read

--
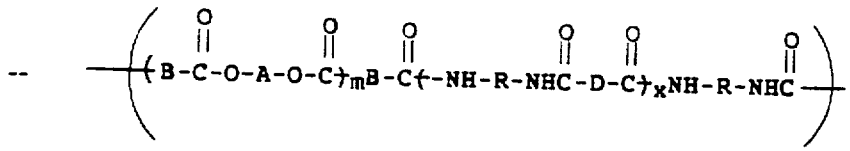
--.

Signed and Sealed this

Twenty-eight Day of February, 1995

Attest:

BRUCE LEHMAN

*Attesting Officer*    *Commissioner of Patents and Trademarks*